(12) United States Patent
Myronenko

(10) Patent No.: US 12,536,664 B2
(45) Date of Patent: *Jan. 27, 2026

(54) ENCODER REGULARIZATION OF A SEGMENTATION MODEL

(71) Applicant: NVIDIA Corporation, Santa Clara, CA (US)

(72) Inventor: Andriy Myronenko, San Mateo, CA (US)

(73) Assignee: NVIDIA Corporation, Santa Clara, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 16/913,085

(22) Filed: Jun. 26, 2020

(65) Prior Publication Data

US 2021/0012504 A1 Jan. 14, 2021

Related U.S. Application Data

(63) Continuation of application No. 16/223,005, filed on Dec. 17, 2018, now Pat. No. 10,740,901.

(51) Int. Cl.
*G06T 7/11* (2017.01)
*G06F 18/21* (2023.01)
(Continued)

(52) U.S. Cl.
CPC ............ *G06T 7/11* (2017.01); *G06F 18/211* (2023.01); *G06F 18/217* (2023.01);
(Continued)

(58) Field of Classification Search
CPC ............ G06T 7/11; G06T 2207/10088; G06T 2207/20076; G06T 2207/20081;
(Continued)

(56) References Cited

U.S. PATENT DOCUMENTS 4,804,831 A 2/1989 Baba et al.
4,907,156 A 3/1990 Doi et al.
(Continued)

OTHER PUBLICATIONS

Gelder et al., Jun. 27, 2018, "Autoencoders for Multi-Label Prostate MR Segmentation" (pp. 1-6). (Year: 2018).*
(Continued)

*Primary Examiner* — Manav Seth
(74) *Attorney, Agent, or Firm* — Davis Wright Tremaine LLP

(57) ABSTRACT

A segmentation model is trained with an image reconstruction model that shares an encoding. During application of the segmentation model, the segmentation model may use the encoding and network layers trained for the segmentation without the image reconstruction model. The image reconstruction model may include a probabilistic representation of the image that represents the image based on a probability distribution. When training the model, the encoding layers of the model use a loss function including an error term from the segmentation model and from the autoencoder model. The image reconstruction model thus regularizes the encoding layers and improves modeling results and prevents overfitting, particularly for small training sizes.

31 Claims, 8 Drawing Sheets

(51) Int. Cl.
*G06F 18/211* (2023.01)
*G06V 10/764* (2022.01)
*G06V 10/82* (2022.01)
*G06F 18/214* (2023.01)

(52) U.S. Cl.
CPC ............ *G06V 10/764* (2022.01); *G06V 10/82* (2022.01); *G06F 18/214* (2023.01); *G06T 2207/10088* (2013.01); *G06T 2207/20076* (2013.01); *G06T 2207/20081* (2013.01); *G06T 2207/20084* (2013.01); *G06T 2207/30004* (2013.01); *G06V 2201/03* (2022.01)

(58) Field of Classification Search
CPC ........... G06T 2207/20084; G06T 2207/30004; G06K 9/03; G06K 9/6228; G06K 9/6262; G06K 9/6256; G06K 2209/05
See application file for complete search history.

(56) References Cited

U.S. PATENT DOCUMENTS

| | | | |
|---|---|---|---|
| 5,956,435 | A | 9/1999 | Buzug et al. |
| 6,137,531 | A | 10/2000 | Kanzaki et al. |
| 6,337,926 | B2 | 1/2002 | Takahashi et al. |
| 6,586,934 | B2 | 7/2003 | Biglieri et al. |
| 6,611,629 | B2 | 8/2003 | Bender et al. |
| 6,683,974 | B1 | 1/2004 | Nagasawa et al. |
| 6,819,952 | B2 | 11/2004 | Pfefferbaum et al. |
| 6,888,894 | B2 | 5/2005 | Prakash et al. |
| 7,050,503 | B2 | 5/2006 | Prakash et al. |
| 7,602,965 | B2 | 10/2009 | Hong et al. |
| 7,742,650 | B2 | 6/2010 | Xu et al. |
| 7,809,154 | B2 | 10/2010 | Lienhart et al. |
| 7,865,866 | B2 | 1/2011 | Kim et al. |
| 7,958,063 | B2 | 6/2011 | Long et al. |
| 8,094,903 | B2 | 1/2012 | Zhu et al. |
| 8,116,982 | B2 | 2/2012 | Hunter et al. |
| 8,345,944 | B2 | 1/2013 | Zhu et al. |
| 8,620,083 | B2 | 12/2013 | King et al. |
| 8,824,758 | B2 | 9/2014 | Yu et al. |
| 9,383,347 | B2 | 7/2016 | Marugame |
| 9,576,219 | B2 | 2/2017 | Piatrou et al. |
| 9,584,814 | B2 | 2/2017 | Socek et al. |
| 9,621,781 | B2 | 4/2017 | On et al. |
| 9,883,198 | B2 | 1/2018 | Puri et al. |
| 10,311,302 | B2 | 6/2019 | Kottenstette et al. |
| 10,311,334 | B1 | 6/2019 | Florez Choque et al. |
| 10,339,685 | B2 | 7/2019 | Fu et al. |
| 10,346,740 | B2 | 7/2019 | Zhang et al. |
| 10,373,055 | B1 | 8/2019 | Matthey-de-l'Endroit et al. |
| 10,373,056 | B1 | 8/2019 | Andoni et al. |
| 10,380,484 | B2 | 8/2019 | Goel et al. |
| 10,426,442 | B1 | 10/2019 | Schnorr |
| 10,499,081 | B1 | 12/2019 | Wang et al. |
| 10,521,902 | B2 | 12/2019 | Avendi et al. |
| 10,600,184 | B2 | 3/2020 | Golden et al. |
| 10,607,135 | B2 | 3/2020 | Zhang et al. |
| 10,740,901 | B2 * | 8/2020 | Myronenko .......... G06F 18/211 |
| 2006/0072799 | A1 | 4/2006 | McLain |
| 2017/0076438 | A1 | 3/2017 | Kottenstette et al. |
| 2017/0249739 | A1 | 8/2017 | Kallenberg et al. |
| 2018/0239949 | A1 | 8/2018 | Chander et al. |
| 2019/0073563 | A1 | 3/2019 | Chapados et al. |
| 2019/0220691 | A1 | 7/2019 | Valpola et al. |
| 2019/0223725 | A1 | 7/2019 | Lu et al. |

OTHER PUBLICATIONS

Chen et al, "3D intracranial artery segmentation using a convolutional autoencoder" (pp. 714-717) (Year: 2017).*
Oktay et al., "Anatomically Constrained Neural Networks (ACNN): Application to Cardiac Image Enhancement and Segmentation". (pp. 1-13) (Year: 2017).*
Abadi et al., "Tensorflow: Large-Scale Machine Learning on Heterogeneous Distributed Systems," Nov. 9, 2015, 19 pages.
Bakas et al., "Advancing the Cancer Genome Atlas Glioma MRI Collections with Expert Segmentation Labels and Radiomic Features," Scientic Data, 2017, 13 pages.
Bakas et al., "Segmentation Labels and Radiomic Features for the Pre-Operative Scans of the TCGA-GBM Collection," The Cancer Imaging Archive, 2017, 2 pages.
Bakas et al., "Segmentation Labels and Radiomic features for the Pre-operative Scans of the TCGA-LGG Collection," The Cancer Imaging Archive, 2017, 2 pages.
Chen et al., "Encoder-Decoder with Atrous Separable Convolution for Semantic Image Segmentation," Aug. 22, 2018, 18 pages.
Chollet, "Xception: Deep Learning with Depthwise Separable Convolutions." IEEE Conference on Computer Vision and Pattern Recognition, CVPR, 2017, 8 pages.
Doersch, "Tutorial on Variational Autoencoders," Stat, arXiv, Aug. 16, 2016, 23 pages.
He et al., "Identity Mappings in Deep Residual Networks," European Conference on Computer Vision, Jul. 25, 2016, 15 pages.
He et al., "Mask R-CNN," ICCV, 2017, 9 pages.
Huang et al., "Densely Connected Convolutional Networks," In The IEEE Conference on Computer Vision and Pattern Recognition (CVPR), Jul. 2017, 9 pages.
Isensee et al., "No New-Net," International Conference on Medical Image Computing and Computer Assisted Intervention, Sep. 27, 2018, 10 pages.
Kamnitsas et al., "Efficient Multi-scale 3D CNN with fully connected CRF for accurate brain lesion segmentation," Medical Image Analysis, 2016, 18 pages.
Kamnitsas et al., "Ensembles of Multiple Models and Architectures for Robust Brain Tumour Segmentation," 2017, 12 pages.
Kingma et al., "Auto-Encoding Variational Bayes," May 1, 2014, 14 pages.
Long, "Fully Convolutional Networks for Semantic Segmentation," CVPR, 2015, 10 pages.
Menze et al., "The Multimodal Brain Tumor Image Segmentation Benchmark (BRATS)," IEEE Transactions on Medical Imaging, vol. 34(10), Oct. 10, 2015, 32 pages.
Milletari et al., "V-net: Fully convolutional neural networks for volumetric medical image segmentation," Fourth International Conference on 3D Vision (3DV), Oct. 25, 2016, 11 pages.
Ronneberger et al., "U-net: Convolutional networks for biomedical image segmentation," International Conference on Medical Image Computing and Computer-Assisted Intervention, Oct. 5, 2015, 8 pages.
Wang et al., "Automatic Brain Tumor Segmentation using Cascaded Anisotropic Convolutional Neural Networks," 2017, 13 pages.
Wu et al., "Group Normalization," ECCV, 2018, 17 pages.
Zhou et al., "Learning Contextual and Attentive Information for Brain Tumor Segmentation," 2019, 11 pages.
Mckinley et al., "Ensembles of Densely-Connected CNNs with Label-Uncertainty for Brain Tumor Segmentation," International Conference on Medical Image Computing and Computer Assisted Intervention, 2018, 10 pages.

* cited by examiner

ENCODER REGULARIZATION OF A SEGMENTATION MODEL

CROSS-REFERENCE To RELATED APPLICATION

This application is a continuation of U.S. patent application Ser. No. 16/223,005 filed Dec. 17, 2018 which is hereby incorporated by reference in its entirety.

BACKGROUND OF THE INVENTION

An image may be segmented into regions. The designation of portions of an image to a particular segment is termed a segmentation mask. Machine learning models, such as neural networks, may be trained to generate a segmentation mask for an input image. For complex images or for data sets with limited training data, existing models may generate segmentation masks that may have poor quality relative to known segmentation for images. As one example, of such complex data with limited training data, three-dimensional medical imaging data segmented to designate abnormal tissue may be particularly challenging for automated systems to produce predicted segmentation that closely matches the identification of abnormal tissue by a medical professional. Improvements in automatic segmentation of such images (among other kinds) may improve medical outcomes and reduce delays of radiological procedures and interpretation.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1A:
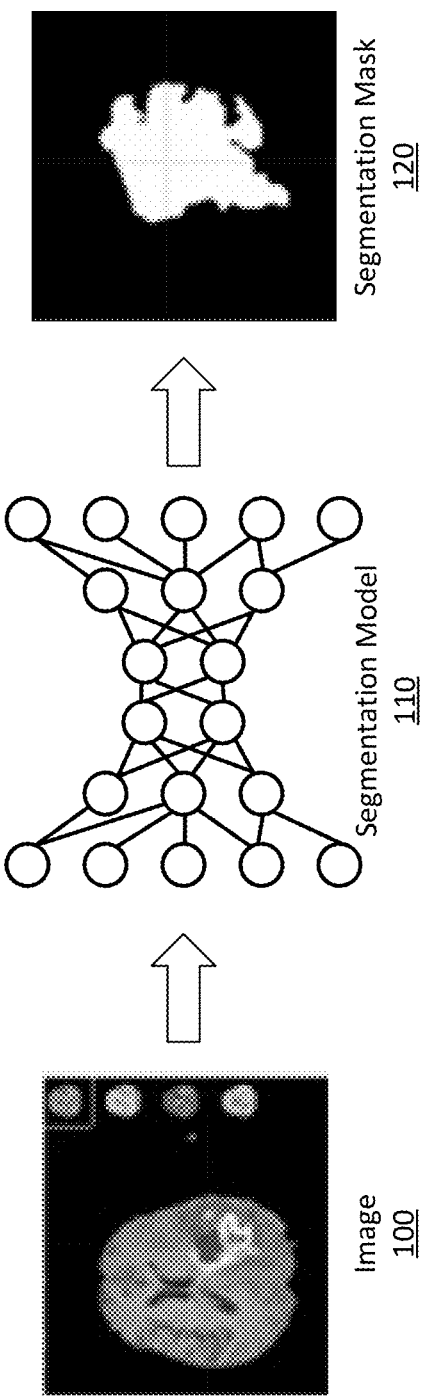
FIG. 1A shows an example generation of a segmentation mask for an image with a segmentation model according to one embodiment

FIG. 1A shows an example generation of a segmentation mask 120 for an image 100 with a segmentation model 110 according to one embodiment. In one embodiment, the image 100 is a magnetic resonance imaging (MRI) scan of a patient as discussed further below. The segmentation mask identifies or "segments" regions of interest in the image. In this example, the segmentation mask may identify regions of interest in the scan that may represent possible tumors present in the brain of the patient being imaged. As an example, an image that is an aerial view of a geographical region may have a segmentation mask generated that designates which portions of the aerial view can likely be classified as roads or highways. The generated segmentation mask is typically the same size as the input image (or the representation of that image applied to the segmentation model) and may specify a value for each pixel (or location) in the input image. The value of a pixel in the segmentation mask represents the likelihood that the associated pixel in the input image belongs to the category or segment of interest for the segmentation. The values of the segmentation mask are typically the range of zero to one representing the percentage likelihood that the associated location is identified with that segmentation. Continuing the example of the geographical region, if the aerial view is 100×100, the output of the segmentation mask is typically the same size of 100×100 (or can be scaled to the same size) such that the mask may conceptually overlay the view and designate portions of the view that are roads. In this example, a value over 0.5 in the segmentation mask may represent an road is likely at that portion of the aerial view, while a value under 0.5 may represent that no road is likely at that location. The segmentation model as discussed herein may be used for many kinds of segmentation tasks for various types of images, such as identifying objects in an environment, likely tumorous tissues, distinguishing background and foreground in an image, and identifying regions of an image containing text.

The segmentation model 110 is a machine learning model (also termed a "computer model") that receives the image 100 and generates a segmentation mask 120 according to the parameters and architecture of the segmentation model. The segmentation model 110 may have various architectures in different embodiments, and for example may include one or more of: neural networks, a linear support vector machine (linear SVM), logistic regression, naive Bayes, memory-based learning, random forests, bagged trees, boosted trees, and the like. As discussed further below, the segmentation model 110 may be trained on a set of training images having known segmentation data. The segmentation model 110 may be trained to learn parameters for the model that improves the model's ability to generate a segmentation mask 120 for the training images that most similarly matches the segmentation data known for the training images. This similarity may be measured by a segmentation error term by comparing the segmentation mask 120 with the image 100. The accuracy of the trained segmentation model may be evaluated with respect to a validation set of images. The validation set of images may also have known segmentation, but the validation set is typically not used in training of the segmentation model 110.

The accuracy of the segmentation model may be quantified by various metrics. The segmentation mask generated by the model for the images in the validation set may be characterized as true positive, false positive, and false negative. A portion of the segmentation mask 120 that the segmentation mask designates as belonging to the segment and that does belong to the segment in the known segmentation is designated a true positive. A portion of the segmentation mask 120 designated as belonging to the segment, but which does not belong to the segment in the known segmentation may be designated a false positive (i.e., incorrectly predicting a positive). A portion of the segmentation mask 120 designated as not belonging to the segment, but which does belong to that segment in the known segmentation may be designated a false negative (i.e., incorrectly predicting a negative).

Example metrics for quantifying the accuracy of the segmentation model 110 include precision, recall, and the F score. Precision is measured by the number of true positives divided by the sum of true positives and false positives (TP/(TP+FP)). Recall is measured by the number of true positives divided by the sum of true positives and false negatives (TP/(TP+FN)). The F score may unify precision and recall into a single measure as 2*PR/(P+R).

Figure 1B:
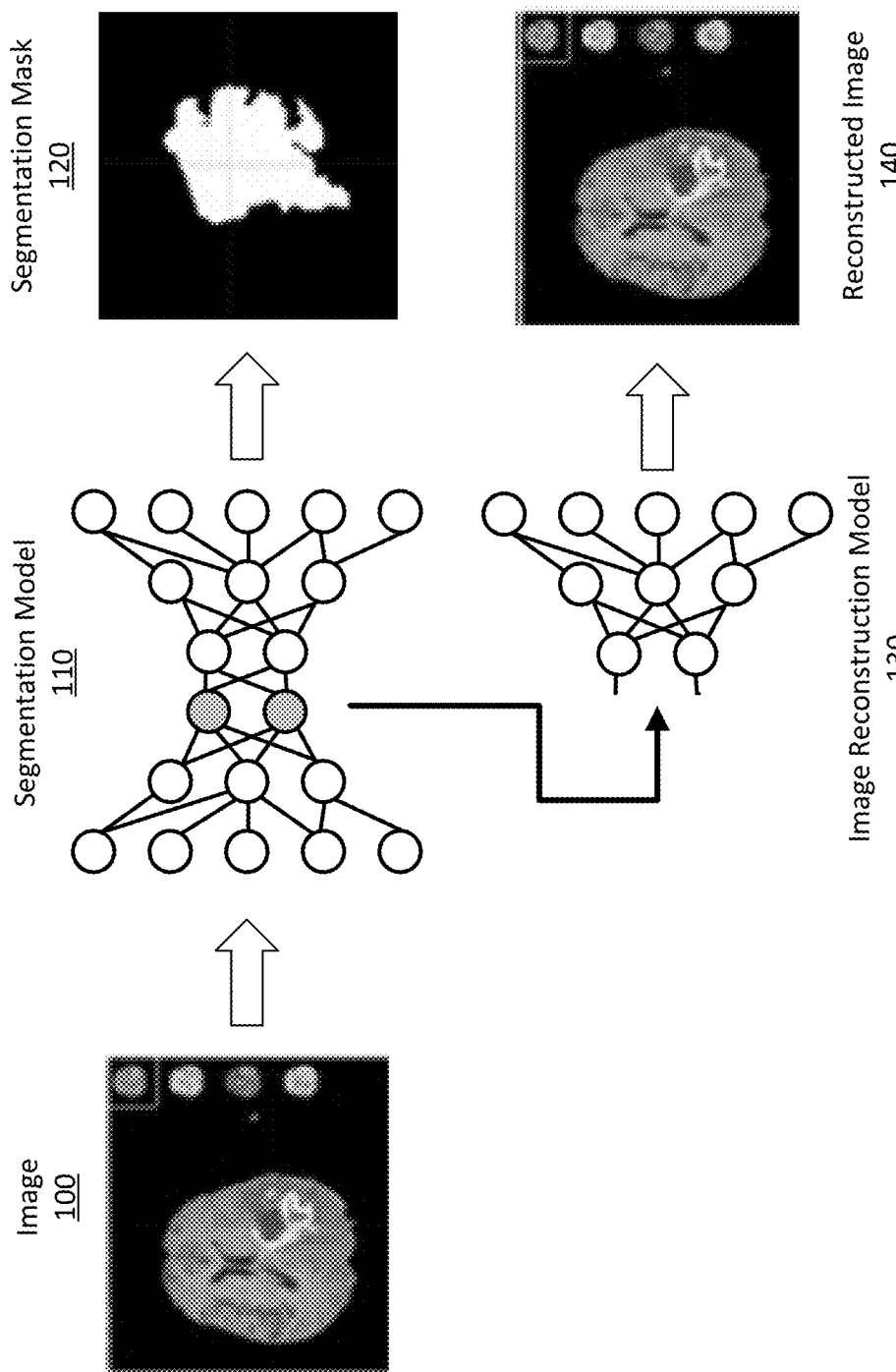
FIG. 1B shows an example architecture that generates a segmentation mask and a reconstructed image according to one embodiment.

FIG. 1B shows an example architecture that generates a segmentation mask 120 and a reconstructed image 140 according to one embodiment. In addition to the segmentation error term, in one embodiment an autoencoder error, which may include a reconstruction error based on the reconstructed image 140, is also used to train parameters of the model. The image reconstruction model 130 uses at least a portion of the data generated by the segmentation model 110 to generate a reconstructed image 140 of the input image 100. Because the image reconstruction model 130 is trained to generate a reconstructed image 140 similar to the image 100, the image reconstruction model 130 may also be considered to operate as an autoencoder that uses an encoding from the segmentation model 110 that is then decoded by the image reconstruction model 130 to generate the reconstructed image 140. In one embodiment, the autoencoder is a variable autoencoder (VAE) that generates a probabilistic representation of the image.

The reconstructed image 140 is compared with the image 100 to generate a reconstruction error that measures the similarity of the reconstructed image 140 to the image 100. The reconstruction error may be included as a component of an autoencoder error that is also used to train the parameters of the segmentation model 110. By including the image reconstruction model 130 in training the segmentation model 110, the accuracy metrics of the segmentation model 110 may improve relative to other training approaches. Because the image reconstruction model 130 uses a portion of the data from the segmentation model 110, the segmentation model learns parameters during training that are also effective in predicting the reconstructed image 140 by the image reconstruction model 130. By learning from the reconstruction as well as the segmentation, the segmentation model 110 may better learn parameters that generalize (or "regularize") the data describing the image within the segmentation model 110. Due to this generalization, the accuracy metrics of the generated segmentation mask 120 for images outside the training set may improve, particularly when the training set may be small and the segmentation model 110 may otherwise overfit the training set. Additional details regarding the images 100, generated segmentation masks 120, and the training process for the segmentation mask 110 are further described below.

Figure 2:
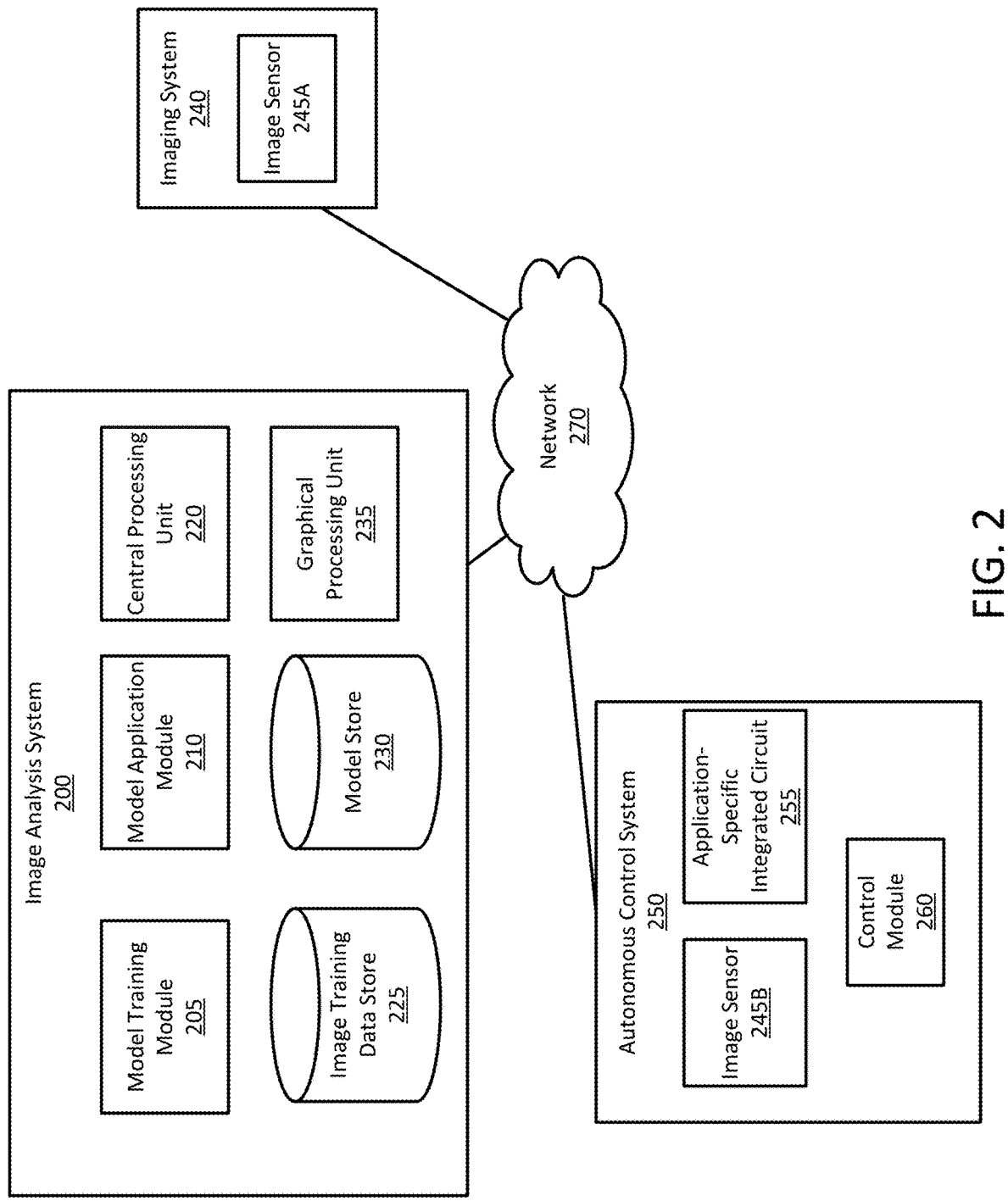
FIG. 2 shows an example system environment for automated segmentation of images according to one embodiment.

FIG. 2 shows an example system environment for automated segmentation of images according to one embodiment. In this example environment, an image analysis system 200 communicates with an imaging system 240 via a network 270. The image analysis system 200 receives images from the imaging system 240 and may use the images for training a segmentation model or for applying the segmentation model to images provided by the imaging system 240. In one example, the segmentation model may be deployed in an autonomous control system 250 or in conjunction with the imaging system 240. An example hardware configuration of these computing devices is provided with respect to FIG. 6.

The imaging system 240 captures images for training and application of the segmentation model of the image analysis system 200. The images that may be captured by the imaging system 240 (and analyzed by the imaging system 200) may include various types of images according to the type of image and segmentation of the particular application for which the segmentation model is trained. The imaging system 240 may capture two or three-dimensional images according to the type of image sensor 245A on the imaging system 240. As one example, the image sensor 245A may be a camera or other two-dimensional imaging sensor that captures an image having a height and a width. For convenience, individual discrete locations within an image are referred to herein as "pixels." In this two-dimensional example, each pixel is associated with a particular location along the width of the image at a particular location along the height of the image. The captured image may have one or more channels at each pixel. For example, a single channel may be captured by a grayscale imaging sensor, where the channel represents light intensity (e.g., grayscale), or the imaging sensor may capture multiple channels according to the color space of the imaging device (e.g., a 2×2 matrix of red, green, blue, and green), or may be formatted to a particular channel format such as RGB. Additional channels outside the visible spectrum may also be included, such as infra-red (e.g., RGBI formats). Thus, a given image may be represented as a multi-dimensional tensor or matrix. In this example, a two-dimensional image having red, green, and blue color channels and a height of 120 pixels and width of 100 pixels may be represented as a matrix of 120×100×3.

As another example, although a single imaging system 240 is shown, multiple imaging systems 240 may provide images to the image analysis system 200 for the segmentation model. Similarly, the image may include multiple views or imaging modalities of a given scene or object. For example, an image may include multiple views from an imaging sensor with multiple filters or lenses applied, such as infrared or a polarized lens. As another example, an image may be a 3-dimensional scan of an object, such as an x-ray or a magnetic resonance imaging (MRI) scan. In the MRI example, multiple MRI modalities may be represented as individual channels of the image. Likewise, where multiple other imaging sensors are available, these may be aligned and combined to form a single image representing the collective scans of the object, which may form a single matrix or tensor for the segmentation model. Although the imaged area is a three-dimensional space having pixels that may be described with respect to a spatial coordinate, the image may be stored as a higher-order matrix or tensor (e.g., in four or more dimensions) to represent the additional channels of information about pixels within the image.

In one embodiment, the image analysis system 200 includes a model training module 205, a model application module 210, an image training data store 225, and a model store 230. In one embodiment, the model training module 205 trains the segmentation model to generate a segmentation mask for an image. The model may be trained on various processing devices, such as a central processing unit 220 (a CPU) or a graphical processing unit 235 (GPU) as shown in relation to the image analysis system 200. In general, a CPU may be optimized for performing a variety of operations sequentially. Comparatively, the GPU 235 is typically specialized for matrix and tensor operations along with parallel processing that may be used for processing a large amount of data in parallel. In addition, other processing architectures may also be used, such as the application-specific integrated circuit 255 (ASIC) shown on the autonomous control system 250. The ASIC may be a specially-developed circuit that implements the logic of the segmentation model in the circuit. In particular, the ASIC may be specially configured to execute training or application of the architecture of the segmentation model in various embodiments. Although these processing components for the models are shown on each of these individual systems, in various embodiments any of these processing components may be disposed at any system.

The model application module 210 may receive requests to segment images from devices such as imaging system 240, apply a segmentation model, and return the segmentation mask for the image to a device requesting the segmentation. The image training data store 225 maintains a set of training images to be used in training the segmentation model. The images may be labeled by a reliable source, for example by human experts. As such, in embodiments in which the images are medical images, a medical professional may designate the known segmentation of the training images. The training images are thus associated with a labeled segmentation that represents the ground truth that the model attempts to learn. Trained model parameters and its architecture may be stored in model store 230.

The segmentation model may be trained and used in a variety of embodiments and related configurations. For example, in one embodiment, the image analysis system 200 receives images and trains the segmentation model. In this aspect, the image analysis system 200 may serve as a central server performing model training and model application for devices requesting segmentation of images. In other configurations, either or both of these functions may instead be performed by edge devices of the network, such as the autonomous control system 250. For example, the image analysis system 200 may send parameters for execution of the segmentation model to the autonomous control system 250.

The image analysis system 200 may perform the training and application of the trained model across many individual systems, and may include additional modules for services requests from client devices for applying segmentation masks to images. Thus, although shown as a single system, the image analysis system 200 may be implemented as a plurality of systems with distributed storage, processing, and other computing capabilities. For example, the image analysis system 200 in one embodiment may be instantiated as a virtual machine or container on a cloud computing platform. In addition the image analysis system 200 may include additional modules to distribute trained segmentation models to systems that will apply the trained segmentation modules. For example, the segmentation model, when trained, may be distributed to the vehicle control system 250. In this example, the ASIC 255 disposed on the autonomous control system 250 may be configured to execute the architecture of the segmentation model according to trained parameters. After training of the segmentation model, the image analysis system 200 may provide the trained parameters to the autonomous control system 250 to apply to the application-specific integrated circuit 255. The autonomous control system 250 may then obtain images received from the image sensor 245B and provide the images to the ASIC 255. When the ASIC 255 generates a segmentation mask according to the parameters received by the image analysis system 200, the segmentation mask and image may be provided to the control module 260 for control and other operation of the autonomous control system 250. For example, the segmentation mask may be configured in one embodiment to identify objects in an environment of the autonomous control system 250 or to identify text on signs in the environment. The segmentation mask may be used by the control module 260 to identify characteristics of the environment and determine an appropriate action for actuators of the autonomous control system 250.

The image training data store 225 maintains the training data for training the segmentation model. Though shown here as a portion of the image analysis system 200, the training images and associated labeled segmentation of the images may be retrieved from a remote system as needed by the image analysis system 200. The training images are typically the same type of image to which the trained segmentation model will be applied. For example, a segmentation model trained with two-dimensional images having RGB color channels will typically be used for segmentation of images having the same dimensions and color channels. Each training image is also associated with a known or trusted segmentation of the training image. For example, the training image may have been labeled by a human or another system with the "correct" segmentation for the image. Often, obtaining reliable training data is difficult, and many training data sets have limited training data with reliable segmentation labels. For example, for images of MRI modalities segmented with likely tumor locations, correctly obtaining labels of these images often requires extensive review by a trained medical professional, and limited training data is available.

Figure 3A:
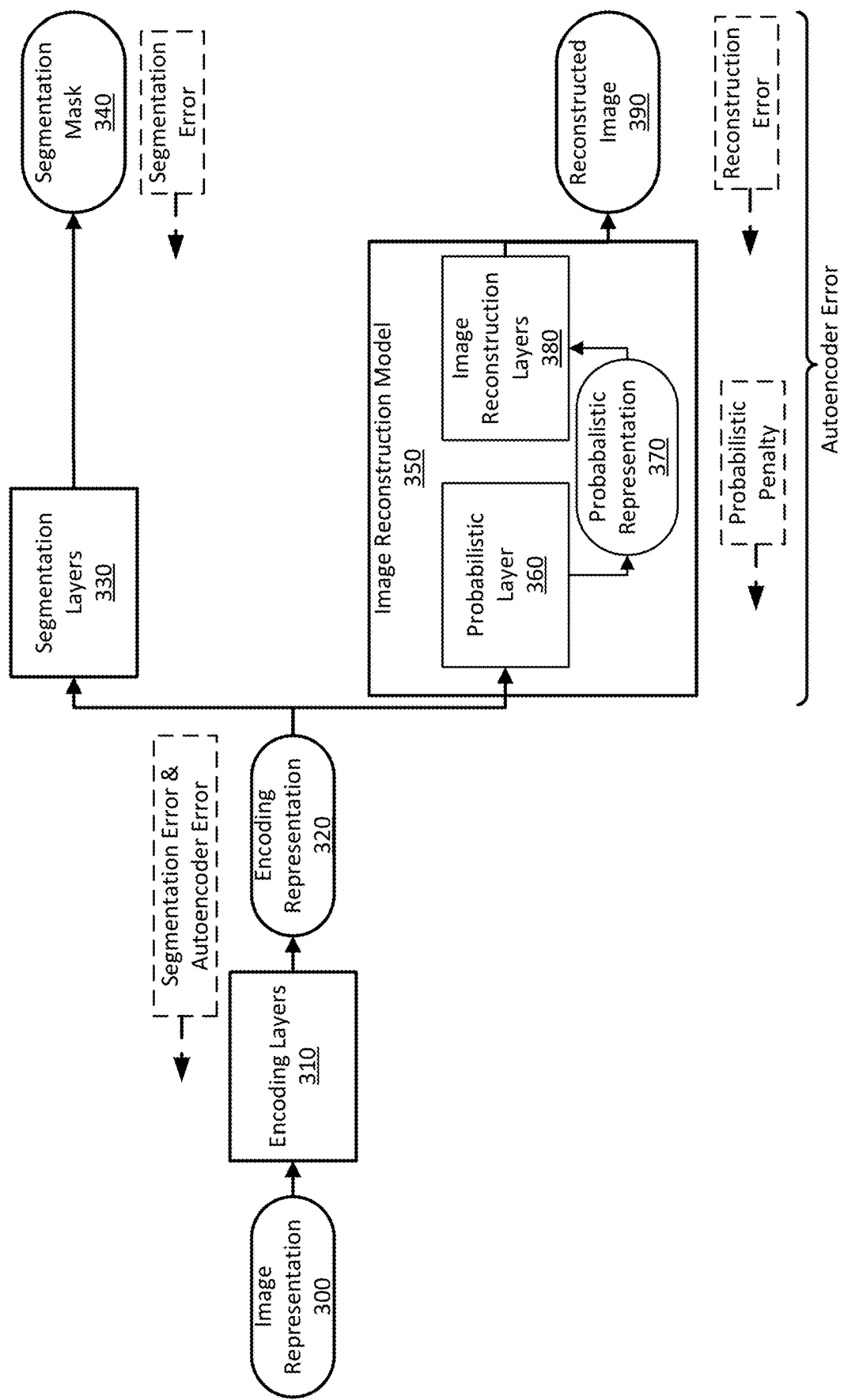
FIG. 3A illustrates an example architecture for training a segmentation model according to one embodiment.

FIG. 3A illustrates an example architecture for training a segmentation model according to one embodiment. The training of this architecture may be performed by the model training module 205. The segmentation model shown in FIG. 3A generates a segmentation mask 340 from an image representation 300 through the machine learning model that may include one or more encoding layer 310 and one or more segmentation layers 330. During training, an image reconstruction model 350 also generates a reconstructed image 390 that may be used to evaluate an autoencoder error.

The images may not be suitable to use directly in the architecture of the segmentation model. The image representation 300 is a version of an image suitable to be input to the segmentation model. For example, the segmentation model may be configured to receive images at a specified resolution, such as 300×250, or with a specified number of channels or with other characteristics that differ from the image. The image analysis system 200 may crop, resize, or otherwise apply an image manipulation to prepare the image for use in the model and generate the image representation.

Figure 4:
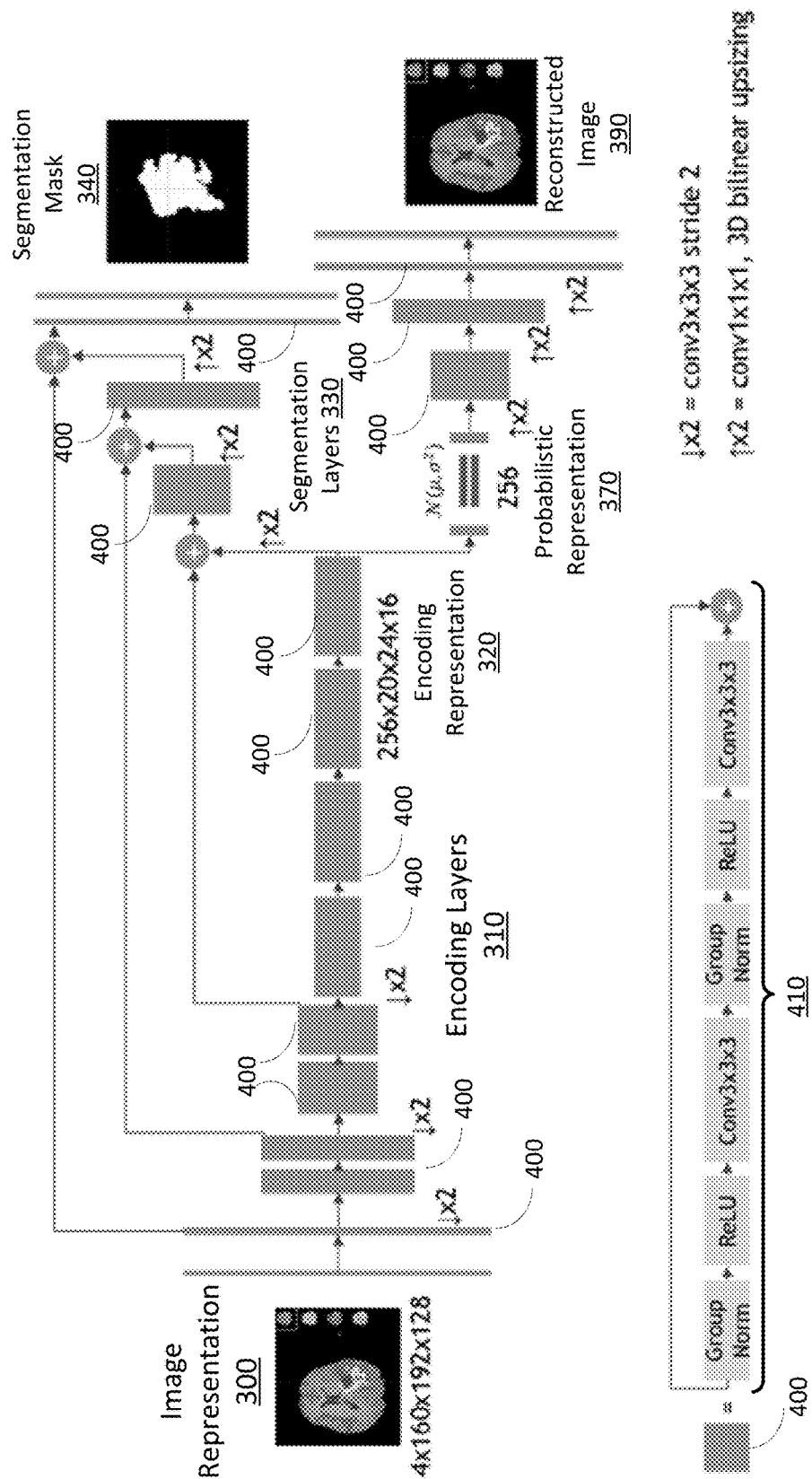
FIG. 4 is an example of an architecture for training a segmentation model for medical imaging, according to one embodiment.

The segmentation model includes a plurality of processing layers that apply parameters, or weights, to the data entering the respective processing layer to generate data exiting the layer. To train the model, the parameters may be initialized with default or semi-randomized values. Then, in training the computer model, the weights of the layers may be modified to improve the evaluated error of the model with respect to the training images. In one embodiment these layers implement a neural network having a plurality of nodes within a layer, where the nodes receive and process data from a prior layer. For example, the parameters for a layer may define the weighted combination of the nodes that make up another layer of the neural network. The individual layers of the neural network may apply convolutions, pooling, rectification, and neural network functions for processing the prior layer. The individual combination of these functions may be selected by one skilled in the art. One embodiment is shown in FIG. 4.

To generate the segmentation mask 340, the image representation 300 is applied through the layers of the machine learning model according to the current parameters of the machine learning model. In particular, the image representation 300 is input to a first layer of by one or more encoding layers 310. The encoding layers 310 typically reduce the size of the dimensions of the image representation 300, for example by reducing the length and width of the image representation 300 by half or a quarter, for example so that a 128×128 image representation is reduced to a size of 64×64. The output of the encoding layers 310 is an encoding representation that encodes and characterizes the image representation 300. In training, the image reconstruction model 350 uses the encoding representation 320 to generate a reconstructed image 390 according to the parameters of the image reconstruction model 350. In one embodiment, the encoding representation 320 is also the smallest dimension of a layer within the segmentation model. For example, a size 128×128 image representation may have a size of 16×16 when applied to the encoding layers 310 to generate the encoding representation 320. Thus, the encoding representation 320 designates the portion of data generated by applying the segmentation model in the segmentation that is used as an input to the image reconstruction model 350.

The encoding representation 320 is input to the segmentation layers 330 which apply the parameters of the segmentation layers 330 to generate the segmentation mask 340. The segmentation mask 340 is typically the same size as the image representation 300. To generate the segmentation mask 340 at the same size as the image representation 300, the segmentation layers 330 may include deconvolution layers that increase the dimensions of the layers to up-scale the encoding to the size of the image representation while generating the values for the segmentation mask 340. During training of the segmentation model, the generated segmentation mask 340 (according to the then-existing parameters of the model) is compared to the known "grown truth" segmentation of the image to determine an error value for the segmentation mask. For example, the pixel value intensities might be compared for each pixel in the segmentation mask 340 to the corresponding pixel in the labeled segmentation data. The more significantly the generated segmentation mask 340 differs from the known segmentation of the image, the larger the segmentation error value. The segmentation error may be used as part of a loss function for evaluating the parameters of the segmentation layers 330, and the training process may evaluate modifications of the parameters to reduce the loss function (and thus the error of the segmentation mask relative to the known segmentation). The loss function may be propagated through the network by applying a variety of model training algorithms, such as gradient descent, simulated annealing, evolutionary algorithms, and so forth. The training and modification of parameters may then be backpropagated through the segmentation layers 330 and encoding layers 310 according to the error of each of the training images with respect to the segmentation of the image.

For small data sets, such as hundreds or thousands of images, this process can often over-fit the data and learn the exact training data without learning parameters that performs well with other images of the same type (i.e., that were not in the training set but should be generalizable). To improve the generalizability of the segmentation model training and regularize the training of the segmentation model, the training architecture includes a reconstruction error for modifying the encoding layers based on the image reconstruction model 350. While the segmentation model generates a segmentation mask of the image to be evaluated for segmentation error against the segmentation of the image, the image reconstruction model 350 generates an autoencoder error evaluated against the match of the generated image and the original image (i.e., for how closely the same image was reconstructed). The image reconstruction model receives the encoding representation 320 and generates the reconstructed image 390 from the encoding representation 320 by applying the encoding representation 320 as an input to the layers of the image reconstruction model 350. As with the segmentation layers 330, the image reconstruction layers 380 include deconvolution layers to increase the dimensions of the encoding representation to the reconstructed image 390. Accordingly, the image reconstruction model 350 can compare the generated image to the original image to determine a reconstruction error of the image reconstruction model 350. In one embodiment, the reconstruction error is one component of the error from the autoencoder. To train the image reconstruction model 350, the error may be back-propagated to the layers of the image reconstruction model 350.

In addition to propagating the segmentation error to the segmentation layers 330 and the autoencoder error to the segmentation layers 330, a combination of the error from each may be propagated to the encoding layers 310. The error may be a linear combination of the segmentation error and the autoencoder error, and in one embodiment weighs the segmentation error more highly. In one example, the segmentation error has a weight of 0.9 and the autoencoder error has a weight of 0.1.

In some embodiments (not shown) the image reconstruction layers 380 receive the encoding representation 320 to generate the reconstructed image 390.

In one embodiment shown in FIG. 3A, the image reconstruction model 350 includes a probabilistic layer 360 that generates a probabilistic representation 370. Rather than use a static value of the encoding representation 320 to represent the image in creating the reconstructed image, the probabilistic representation 370 represents the image as a probability distribution. The probabilistic distribution may describe frequencies of values within the distribution, and in embodiments is a gaussian distribution, binomial distribution, multinomial distribution, poisson distribution, or other suitable probabilistic distribution. In one embodiment, the probabilistic representation is a vector of probability distributions defined by a mean and a standard deviation. For example, a vector of 128 mean distribution values and 128 standard deviation values. By explicitly incorporating uncertainty in the image reconstruction with the probability distribution, the image reconstruction model may better account for overfitting the training data. In particular, the probabilistic representation is a latent vector representing the image, and because the latent vector is represented as a probability distribution, it prevents the model from learning exactly one value for an image, and therefore from "memorizing" individual training images, because the latent vector is forced to be represented probabilistically. The probabilistic representation 370 may be generated by a probabilistic layer 360 from the encoding representation 320 according to parameters of the probabilistic layer 360. In addition, by including autoencoder error from the probabilistic representation 370 and probabilistic layer 360 in back propagating error to the encoding layers 310, the parameters of the encoding layers 310 are typically incentivized to "cluster" encoded characteristics of the images in the encoding representation, such that the same type of characteristic of the image representation is discouraged from appearing in multiple places of the encoding representation 320.

In addition to the reconstruction error from the reconstructed image 390, in one embodiment the autoencoder error includes a penalty for the probabilistic representation that incentivizes the representation to have a mean of zero and a standard deviation of one. Said another way, this penalty increases as probabilistic representations increasingly deviate from the incentivized distribution (e.g., mean 0, std. dev. 1). By including a penalty for the probabilistic representation in the autoencoder error along with the reconstruction error, the encoding layers 310 are more likely to learn parameters for the encoding layers 310 that represent the representation of the image as a whole, rather than just the information that may have been gleaned from the segmentation error, which may prevent effective generalization. The model training module 205 trains the segmentation model by applying the training image to the network to generate a segmentation mask 340 and a reconstructed image 390, evaluates a segmentation error and an autoencoder error, and modify parameters of the network by back propagating these errors. After training the parameters for the model, the model architecture and its parameters may be stored in the model store 230.

Figure 3B:
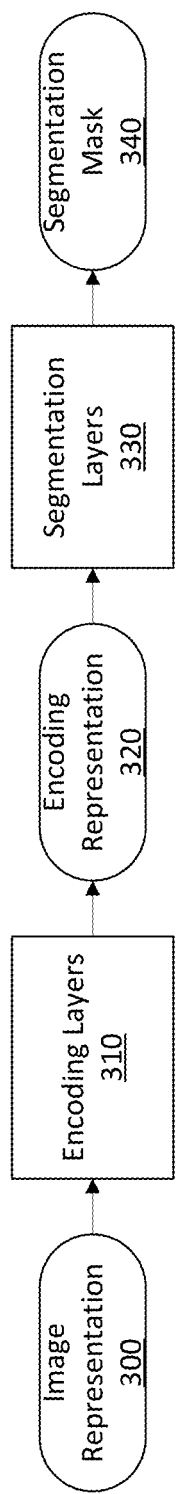
FIG. 3B illustrates an example of the segmentation model applied to an image after training, according to one embodiment.

FIG. 3B illustrates an example of generating a segmentation mask for image after training, according to one embodiment. As shown in FIG. 3B, after training, the image reconstruction model 350 is not necessary for a prediction of the segmentation mask for a new image. The model application module 210 may retrieve the architecture and parameters of the encoding layers 310 and segmentation layers 330. The model application module 210 may then input the image representation 300 to the encoding layers 310 to generate the encoding representation 320 to be applied to the segmentation layers 330 and generate the segmentation mask 340.

FIG. 4 is an example of an architecture for training a segmentation model for medical imaging, according to one embodiment. In this example, the image representation has four modalities of an MRI scan, such that the input representation has the dimensions 4×160×192×128 representing four modalities having a special size of 160×192×128, which may have been obtained by cropping the input image. As shown in FIG. 4, the encoding layers include multiple layers that process and reduce the size of the image representation 300. Rather than a spatial size of 160×192×128, the encoding representation 320 is reduced to a spatial size of 20×24×16. However, the encoding representation has additional detail in the form of additional channels (256) representing richer information about each spatial pixel. In this example of FIG. 4, each block 400 represents a set of layers 410, including a group norm, convolution, and rectifier linear unit (ReLU) layers. Specifically, the block 400 includes two convolutions with normalization and RELU, with an additive identify skip connection. In this example, the model is asymmetrical, such that there are more encoding layers than either segmentation layers or image reconstruction layers. In this example, the loss function applied to the encoding layers included a weight of 1.0 for the segmentation loss, and a weight of 0.1 for the probabilistic penalty (KL divergence) from the prior distribution of the desired Gaussian, and a 0.1 weight for the reconstruction error. In this embodiment, including the image reconstruction model to regularize the segmentation model, while not heavily weighted, significantly improved model performance for tumor prediction with a limited training set of a 285 images (each with four 3D MRI modalities).

Figure 5:
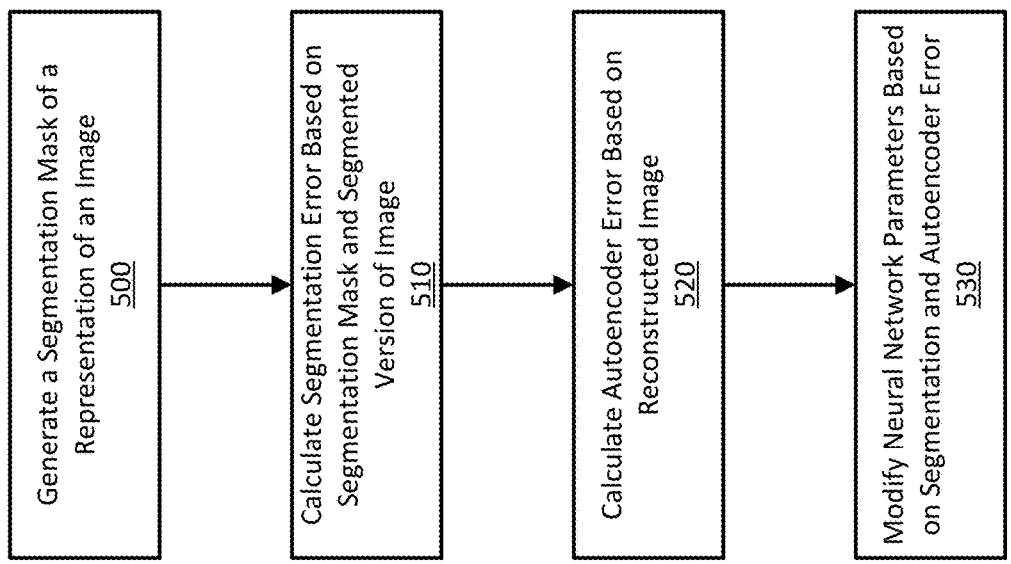
FIG. 5 is an example method for training a segmentation mask according to one embodiment.

FIG. 5 is an example method for training a segmentation model according to one embodiment. This method may be performed, for example, by a model training module 205 of an image analysis system 200. Initially, the model training module 205 generates 500 a segmentation mask according to existing parameters of a representation of an image. Based on the segmentation mask, the model training module 205 calculates 510 a segmentation error based on a comparison with a segmented version of the image. In addition, the model training module 205 calculates 520 an autoencoder error based on a reconstructed image. With the autoencoder error and the segmentation error, the model training module 200 modifies 530 the neural network parameters.

Figure 6:
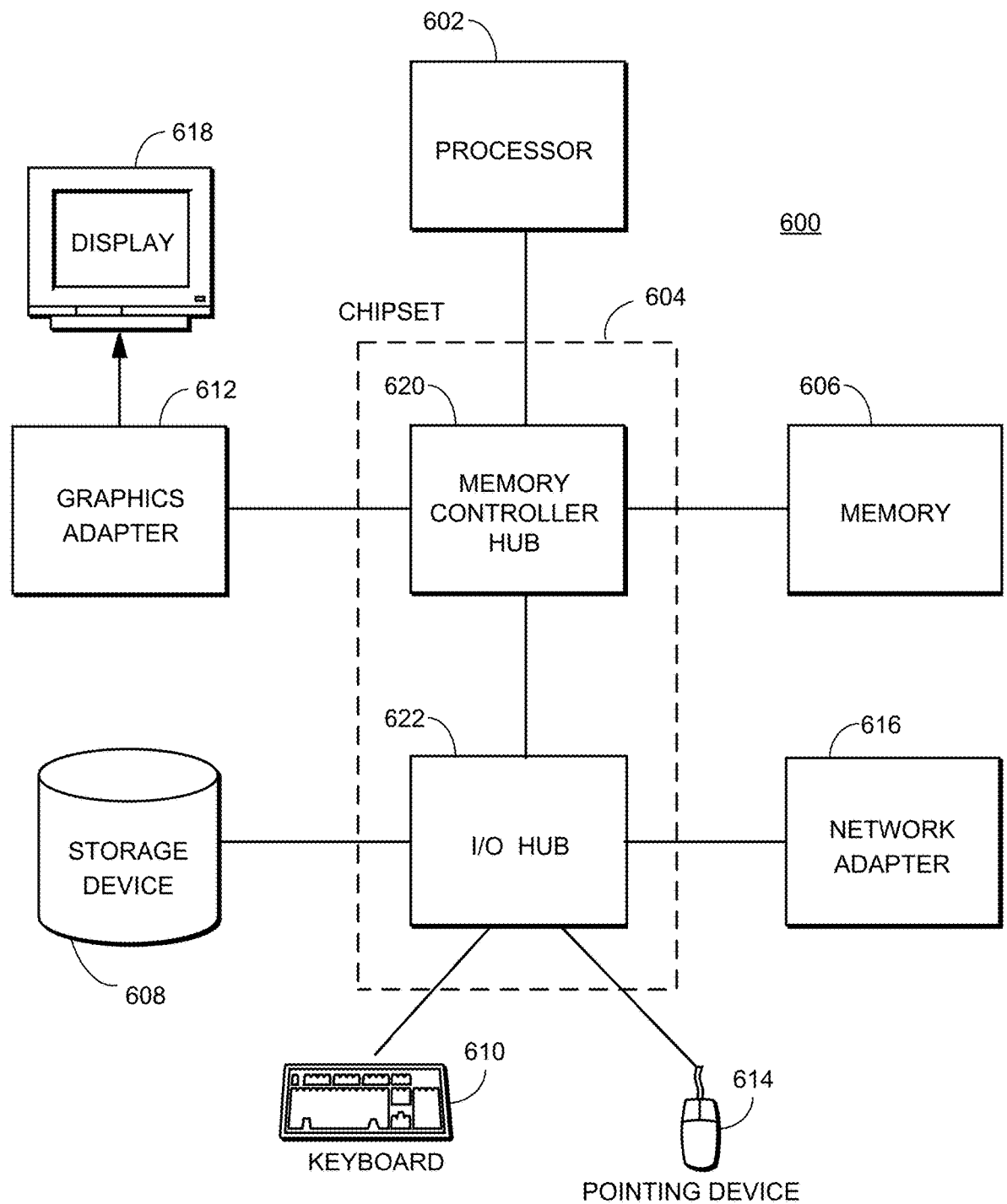
FIG. 6 is a high-level block diagram illustrating physical components of a computer used as part or all of one or more of the entities described herein according to one embodiment.

FIG. 6 is a high-level block diagram illustrating physical components of a computer 600 used as part or all of one or more of the computing systems described herein in one embodiment. For example, instances of the illustrated computer 600 may be used as a server operating the image analysis system 200. Illustrated are at least one processor 602 coupled to a chipset 604. Also coupled to the chipset 604 are a memory 606, a storage device 608, a keyboard 610, a graphics adapter 612, a pointing device 614, and a network adapter 616. A display 618 is coupled to the graphics adapter 612. In one embodiment, the functionality of the chipset 604 is provided by a memory controller hub 620 and an I/O hub 622. In one embodiment, the memory 606 is coupled directly to the processor 602 instead of the chipset 604. In one embodiment, one or more sound devices (e.g., a loudspeaker, audio driver, etc.) is coupled to chipset 604.

The storage device 608 is any non-transitory computer-readable storage medium, such as a hard drive, compact disk read-only memory (CD-ROM), DVD, or a solid-state memory device. The memory 606 holds instructions and data used by the processor 602. The pointing device 614 may be a mouse, track ball, or other type of pointing device, and is used in combination with the keyboard 610 to input data into the computer 600. The graphics adapter 612 displays images and other information on the display 618. The network adapter 616 couples the computer system 800 to a local or wide area network.

As is known in the art, a computer 600 can have different and/or other components than those shown in FIG. 6. In addition, the computer 600 can lack certain illustrated components. In one embodiment, a computer 600 acting as a server may lack a keyboard 610, pointing device 614, graphics adapter 612, and/or display 618. Moreover, the storage device 608 can be local and/or remote from the computer 600 (such as embodied within a storage area network (SAN)).

As is known in the art, the computer 600 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 608, loaded into the memory 606, and executed by the processor 602.

The foregoing description of the embodiments has been presented for the purpose of illustration; it is not intended to be exhaustive or to limit embodiment to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. Accordingly, the disclosure of the embodiments is intended to be illustrative, but not limiting.

What is claimed is:

1. A method comprising:
    generating an encoding representation based, at least in part, on a first image;
    generating a second image from the encoding representation;
    generating a segmentation based, at least in part, on the encoding representation;
    calculating an error based, at least in part, on the encoding representation, the segmentation, and the second image; and
    updating one or more neural networks based, at least in part, on the error.

2. The method of claim 1, further comprising generating the second image using one or more autoencoders of one or more neural networks.

3. The method of claim 1, further comprising training one or more neural networks based, at least in part, on a first set of data computed based, at least in part, on the segmentation and a second set of data computed based, at least in part, on the second image.

4. The method of claim 1, further comprising generating the segmentation using one or more neural networks during training of the one or more neural networks, where the training is based, at least in part, on the second image and the segmentation.

5. The method of claim 1, wherein the second image is to be generated by one or more neural networks comprising at least an autoencoder, wherein the one or more neural networks are to generate the segmentation during training of the one or more neural networks.

6. The method of claim 1, further comprising one or more autoencoders to generate the second image, where one or more errors are to be computed based, at least in part, on data generated by the one or more autoencoders and the one or more errors are usable to generate the segmentation during training of the one or more neural networks.

7. The method of claim 1, wherein the first image comprises three-dimensional medical imaging data.

8. One or more processors comprising:
    circuitry to generate a second image and segmentation information based, at least in part, on an encoding representation of a first image, and to update a neural network based, at least in part, on the second image, the encoding representation, and the segmentation information.

9. The one or more processors of claim 8, wherein the circuitry is to train one or more neural networks based, at least in part, on the second image and the segmentation information.

10. The one or more processors of claim 8, wherein the circuitry is to calculate one or more first types of error values based, at least in part, on the segmentation information and one or more second types of error values based, at least in part, on the second image, and one or more neural networks are to be trained based, at least in part, on the one or more first types of error values and the one or more second types of error values.

11. The one or more processors of claim 8, wherein the second image is to be generated, at least in part, by one or more autoencoders.

12. The one or more processors of claim 8, wherein one or more circuits are to generate the segmentation based, at least in part, on the first image during training of one or more neural networks, where the one or more circuits are to train the one or more neural networks based, at least in part, on the segmentation and the second image.

13. The one or more processors of claim 8, wherein the circuitry is to train one or more neural networks to generate the segmentation information based, at least in part, on the first image, where the one or more neural networks are to generate the second image using one or more autoencoders.

14. The one or more processors of claim 8, wherein the segmentation information comprises one or more data values usable to identify one or more objects in the first image.

15. The one or more processors of claim 8, wherein the first image comprises medical imaging data and the second image comprises at least one or more portions of the first image.

16. A system comprising:
    one or more processors to:
        generate an encoding representation based, at least in part, on a first image;
        generate a second image from the encoding representation;

generate a segmentation based, at least in part, on the encoding representation;

calculate an error based, at least in part, on the encoding representation, the segmentation, and the second image; and update one or more neural networks based, at least in part, on the error; and one or more memory devices to at least partially store the one or more neural networks.

17. The system of claim 16, further comprising one or more autoencoders to generate, at least in part, the second image.

18. The system of claim 16, wherein the one or more processors are to generate the second image and the segmentation using one or more neural networks.

19. The system of claim 16, wherein the one or more processors are to generate the second image using one or more neural networks and the one or more neural networks comprise one or more autoencoders and the one or more processors are to train the one or more neural networks based, at least in part, on the second image and the segmentation.

20. The system of claim 16, further comprising a neural network usable to generate the segmentation and the second image, wherein one or more processors are to train the neural network based, at least in part, on one or more first types of error values calculated based, at least in part, on the segmentation and one or more second types of error values calculated based, at least in part, on the second image.

21. The system of claim 16, further comprising one or more neural networks to generate the segmentation based, at least in part, on the first image, where the one or more processors are to train the one or more neural networks based, at least in part, on the segmentation and the second image.

22. The system of claim 16, wherein the first image comprises medical imaging data and the segmentation is to indicate one or more objects in the first image.

23. A non-transitory computer-readable medium having stored thereon one or more instructions, which if performed by one or more processors, cause the one or more processors to at least:

generate an encoding representation based, at least in part, on a first image;

generate a second image from the encoding representation;

generate a segmentation based, at least in part, on the encoding representation;

calculate an error based, at least in part, on the encoding representation, the segmentation, and the second image; and update one or more neural networks based, at least in part, on the error; and one or more memory devices to at least partially store the one or more neural networks.

24. The non-transitory computer-readable medium of claim 23, further comprising instructions which, if performed by the one or more processors, cause the one or more processors to generate the second image using one or more autoencoders of one or more neural networks, where the one or more neural networks are to be trained based, at least in part, on the second image and the segmentation.

25. The non-transitory computer-readable medium of claim 23, further comprising instructions which, if performed by the one or more processors, cause the one or more processors to generate the second image using one or more autoencoders, where one or more error values of the one or more autoencoders is to be used to train one or more neural networks with the segmentation.

26. The non-transitory computer-readable medium of claim 23, further comprising instructions which, if performed by the one or more processors, cause the one or more processors to compute a first set of error values using the segmentation and a second set of error values using the second image, the first set and the second set usable to train one or more neural networks comprising one or more autoencoders usable to generate the second image.

27. The non-transitory computer-readable medium of claim 23, further comprising one or more neural networks to generate the segmentation and the second image.

28. The non-transitory computer-readable medium of claim 23, further comprising one or more autoencoders to generate the second image.

29. The non-transitory computer-readable medium of claim 23, further comprising error information generated based, at least in part, on the second image and the segmentation, where the error information is to be usable to train one or more neural networks.

30. The non-transitory computer-readable medium of claim 23, wherein the segmentation is a set of data comprising data values to identify one or more portions of the first image.

31. The non-transitory computer-readable medium of claim 23, wherein the first image comprises magnetic resonance imaging data and the segmentation is usable to identify one or more objects in the first image.

* * * * *